US006694105B2

(12) United States Patent
Chang et al.

(10) Patent No.: US 6,694,105 B2
(45) Date of Patent: Feb. 17, 2004

(54) BURST MODE RECEIVING APPARATUS HAVING AN OFFSET COMPENSATING FUNCTION AND A DATA RECOVERY METHOD THEREOF

(75) Inventors: Young-jun Chang, Seoul (KR); Hyun-soo Chae, Seoul (KR); Gun-hee Han, Goyang (KR); Hyun-surk Ryu, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/183,046

(22) Filed: Jun. 27, 2002

(65) Prior Publication Data

US 2003/0012065 A1 Jan. 16, 2003

(30) Foreign Application Priority Data

Jun. 27, 2001 (KR) ..................... 2001-0037049

(51) Int. Cl.[7] ............ H04B 10/06; H03K 5/22
(52) U.S. Cl. ............ 398/202; 327/63; 327/72; 375/318; 375/345
(58) Field of Search .............. 327/63, 72, 307; 375/317, 318, 345; 398/202, 208, 209

(56) References Cited

U.S. PATENT DOCUMENTS

| 4,873,702 | A |   | 10/1989 | Chiu |   |
|---|---|---|---|---|---|
| 5,307,196 | A | * | 4/1994 | Kinoshita | 398/202 |
| 5,475,342 | A | * | 12/1995 | Nakamura et al. | 330/136 |
| 5,612,810 | A | * | 3/1997 | Inami et al. | 398/202 |
| 5,838,731 | A | * | 11/1998 | Nagahori | 375/289 |
| 5,892,609 | A | * | 4/1999 | Saruwatari | 398/202 |
| 5,896,391 | A |   | 4/1999 | Solheim et al. |   |
| 6,595,708 | B1 | * | 7/2003 | Yamashita | 398/202 |

FOREIGN PATENT DOCUMENTS

EP          0 893 899 A2      1/1999

OTHER PUBLICATIONS

Integrated Adaptive Threshold Burst Mode Receivers for Optical Data Links–an Analysis, Robert G. Swartz and Y. Ota, High Speed Electronics and Systems, vol. 6, No. 2, pp. 375–394, 1995.
A 156Mb/s CMOS Optical Receiver for Burst Mode Transmission, Makoto Nakamura et al. Solid State Circuits, vol. 33, No. 8, Aug. 1998, pp 1179–1187.
Nakamura et al, "A 156–Mb/s CMOS Optical.." IEEE J of Solid–State Circuits, 33(8):1179–1187 (Aug. 1998).

* cited by examiner

*Primary Examiner*—Son Mai
(74) *Attorney, Agent, or Firm*—Lee & Sterba, P.C.

(57) ABSTRACT

A burst mode receiving apparatus having an offset compensating function and a data recovery method thereof, including an intermediate value detector to detect and output an intermediate value of an input signal input from an outside source in response to a switching control signal; an amplifier to amplify and output a difference between the input signal and a reference value; an offset compensator to generate a compensation signal having a level varied corresponding to the amplified result input from the amplifier and a compensation control signal; a summing portion to add the compensation signal and the intermediate value to output the added result as the reference value to the amplifier; and a controller to generate the switching control signal and the compensation control signal corresponding to a result obtained by analyzing the amplified result input from the amplifier and a reset signal input from the outside source.

17 Claims, 6 Drawing Sheets

BURST MODE RECEIVING APPARATUS HAVING AN OFFSET COMPENSATING FUNCTION AND A DATA RECOVERY METHOD THEREOF

BACKGROUND OF THE INVENTION

1. Field of the Invention

The present invention relates to offset compensation. More particularly, the present invention relates to a burst mode receiving apparatus having an offset compensating function and a data recovery method thereof.

2. Description of the Related Art

In general, unlike an optical transmission system having a point-to-point connection structure, in a passive optical network (PON) having a point-to-multi points connection structure, a number of optical network units (ONUs) each acting as an optical terminal are connected to a central office through fiber optic cables. Presently, only an ONU that has been granted permission by the central office may transmit its own information upstream to the central office in the form of a packet. The upstream-transmitted optical packets reach an optical receiving apparatus of the central office with different optical powers and phases depending on the ONU. The optical receiving apparatus of the central office must temporarily respond to an input optical power varying dynamically in a packet unit, which is called "a burst mode optical receiving apparatus." Such a burst mode optical receiving apparatus is basically provided with a peak detector for detecting a peak value of an optical signal and a comparator for discriminating between "0" and "1" using an output of the peak detector as a reference value. A burst mode optical receiving apparatus may be characterized as having a feedback-scheme or a feedforward-scheme depending on the configuration type thereof.

One conventional burst mode optical receiving apparatus adopts a feedback structure in which a peak value of an input optical signal is obtained at an output terminal of a preamplifier and the obtained peak value is input to a sub-input terminal of the preamplifier as a reference voltage. Accordingly, for such a conventional burst mode optical receiving apparatus, even if stability of a circuit is improved, there is a problem in that it is not easy to increase both a gain of the preamplifier and an operative bandwidth using a complementary MOS (CMOS) process. Thus, an expensive bipolar junction transistor (BJT) process must be employed. Also, in the case where a signal of "0" in a packet is sustained over a long time period due to a leakage current caused by a base current generated from a transistor fabricated by the BJT process, there is a problem in that a value of voltage charged in a peak capacitor of the peak detector is decreased gradually. Therefore, a reference value may not be set correctly and an external trimming process must be performed for each chip in order to eliminate an offset existing within a limiting amplifier having a very large gain.

Another conventional burst mode optical receiving apparatus includes a preamplifier for amplifying an optically detected electric signal, an automatic bias adjuster for obtaining an intermediate value from a maximum value and a minimum value of the signal, and a limiting section. For such a conventional burst mode optical receiving apparatus of a feedforward-scheme, there is a problem in that, although it may be implemented with a less costly CMOS process, an offset existing within a limiting amplifier allows an output terminal of a limiting amplifier to generate a distorted waveform. Moreover, the feedforward-scheme conventional burst mode optical receiving apparatus encounters additional problems. For example, although the automatic bias adjuster and the limiting section thereof are intended to be connected in multiple stages so that each of the limiter amplifiers amplifies an input optical signal through a series of steps in a linear region to reduce an influence of an offset, the conventional burst mode optical receiving apparatus must use two resistors having the same size to obtain a reference value used to obtain an intermediate value from a maximum value and a minimum value detected by a peak detector. Thus, if the two resistance values are not identical in the manufacture of the conventional burst mode optical receiving apparatus, the reference value cannot be established correctly and it becomes difficult to improve the precision of offset compensation. Moreover, as a gain of an operational amplifier of a feedback-scheme constituting a peak detector decreases, a voltage drop of a peak value of the peak detector is increased and it is difficult to upgrade the peak detector of a feedback-scheme at a higher operational speed.

SUMMARY OF THE INVENTION

In an effort to solve the above-described problems, it is a first feature of an embodiment of the present invention to provide a burst mode receiving apparatus that is able to more precisely compensate for an offset without requiring an external tuning and to operate a higher speed.

It is a second feature of an embodiment of the present invention to provide a data recovery method to be implemented in the burst mode receiving apparatus.

To provide the first feature, there is provided a burst mode receiving apparatus having an offset compensating function, including an intermediate value detector to detect an intermediate value between a maximum value and a minimum value of an input signal of an analog form discretely input from an outside source in response to a switching control signal, and output the detected intermediate value; an amplifier to amplify a difference between the input signal and a reference value, and output the amplified result; an offset compensator to generate a compensation signal having a level varied corresponding to the amplified result input from the amplifier and a compensation control signal; a summing portion to add the compensation signal input from the offset compensator and the intermediate value input from the intermediate value detector to output the added result as the reference value to the amplifier; and a controller to generate the switching control signal and the compensation control signal corresponding to a result obtained by analyzing the amplified result input from the amplifier and a reset signal input from the outside source.

To provide the second feature, there is provided a data recovery method to be implemented in a burst mode receiving apparatus, including: (a) compensating for an offset of the burst mode receiving apparatus; (b) preparing for reception of an input signal from an outside source; (c) determining whether the input signal is given from the outside source, and returning to (b) if it is determined that the input signal is not given from the outside source; (d) detecting an intermediate value between a maximum value and a minimum value of the input signal if it is determined that the input signal is given from the outside source; (e) adding a compensation signal and the detected intermediate value to obtain a reference value; (f) amplifying a difference between the input signal and the reference value and determining the amplified result as recovery data; and (g) initializing the maximum value and the minimum value of the input signal.

BRIEF DESCRIPTION OF THE DRAWINGS

The above and other features and advantages of the present invention will become more apparent upon review of a detailed description of preferred embodiments thereof with reference to the attached drawings in which.

DETAILED DESCRIPTION OF THE INVENTION

Korean Patent Application No. 2001-37049, filed Jun. 27, 2001, and entitled: "Burst Mode Receiving Apparatus Having Offset Compensating Function and Data Recovery Method Thereof," is incorporated by reference herein in its entirety.

Hereinafter, a construction and operation of a burst mode receiving apparatus with an offset compensating function according to a preferred embodiment of the present invention will be described in detail with reference to the accompanying drawings.

Figure 1:
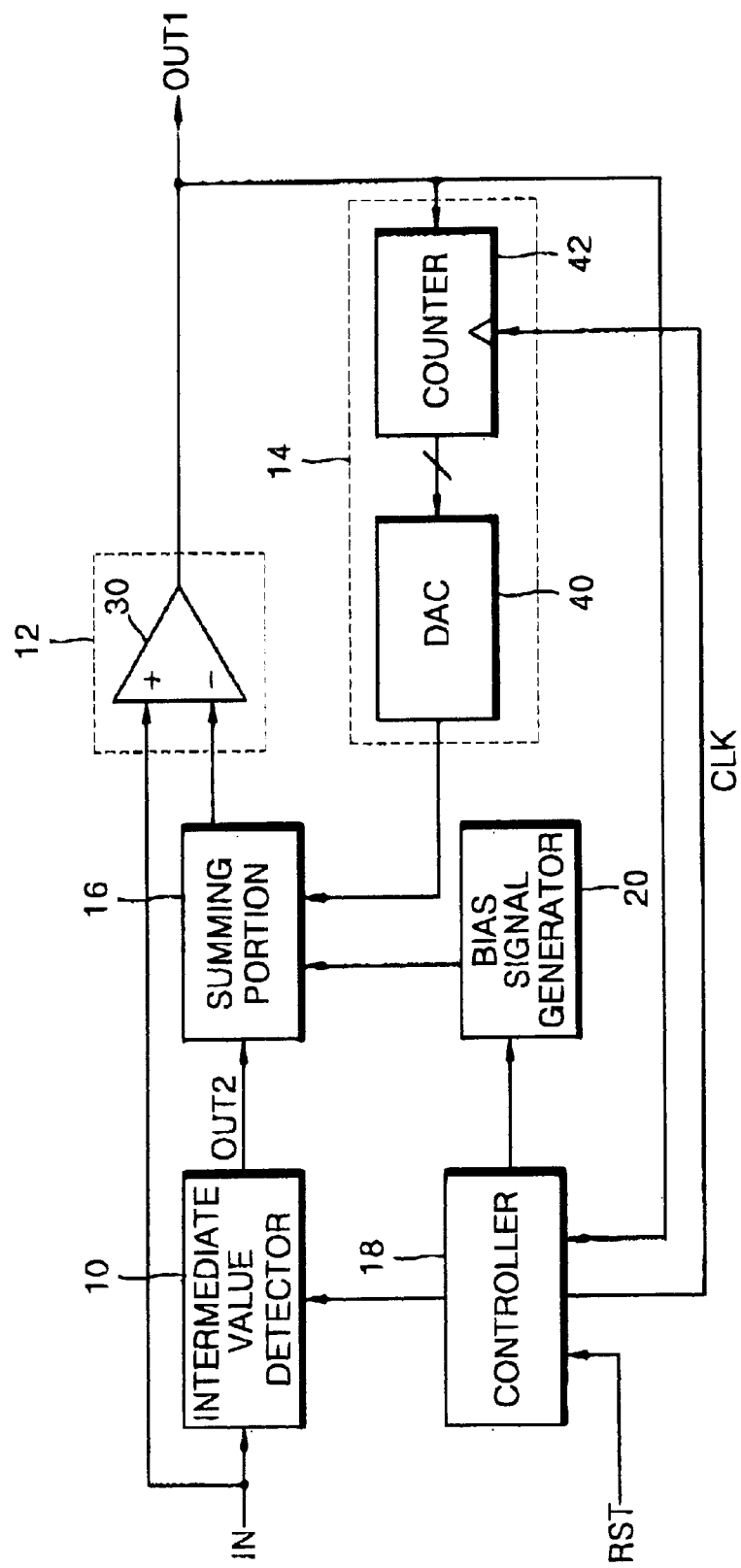
FIG. 1 illustrates a block diagram illustrating the construction of a burst mode receiving apparatus having an offset compensating function according to a preferred embodiment of the present invention.

FIG. 1 illustrates a block diagram illustrating the construction of a burst mode receiving apparatus having an offset compensating function according to a preferred embodiment of the present invention.

Referring to FIG. 1, the burst mode receiving apparatus includes an intermediate value detector 10, an amplifier 12, an offset compensator 14, a summing portion 16, a controller 18 and a bias signal generator 20.

The intermediate value detector 10 acts to detect an intermediate value between a maximum value and a minimum value of an analog input signal input discretely through an input terminal IN in response to a switching control signal generated from the controller 18 and to output the detected intermediate value to the summing portion 16. For this purpose, the controller 18 generates the switching control signal to correspond to a result obtained by analyzing the amplified result input from the amplifier 12 and a reset signal RST input from an outside source and outputs the generated switching control signal to the intermediate value detector 10.

A construction of the intermediate value detector 10, shown in FIG. 1, according to a preferred embodiment of the present invention will now be described in detail with reference to FIG. 2.

Figure 2:
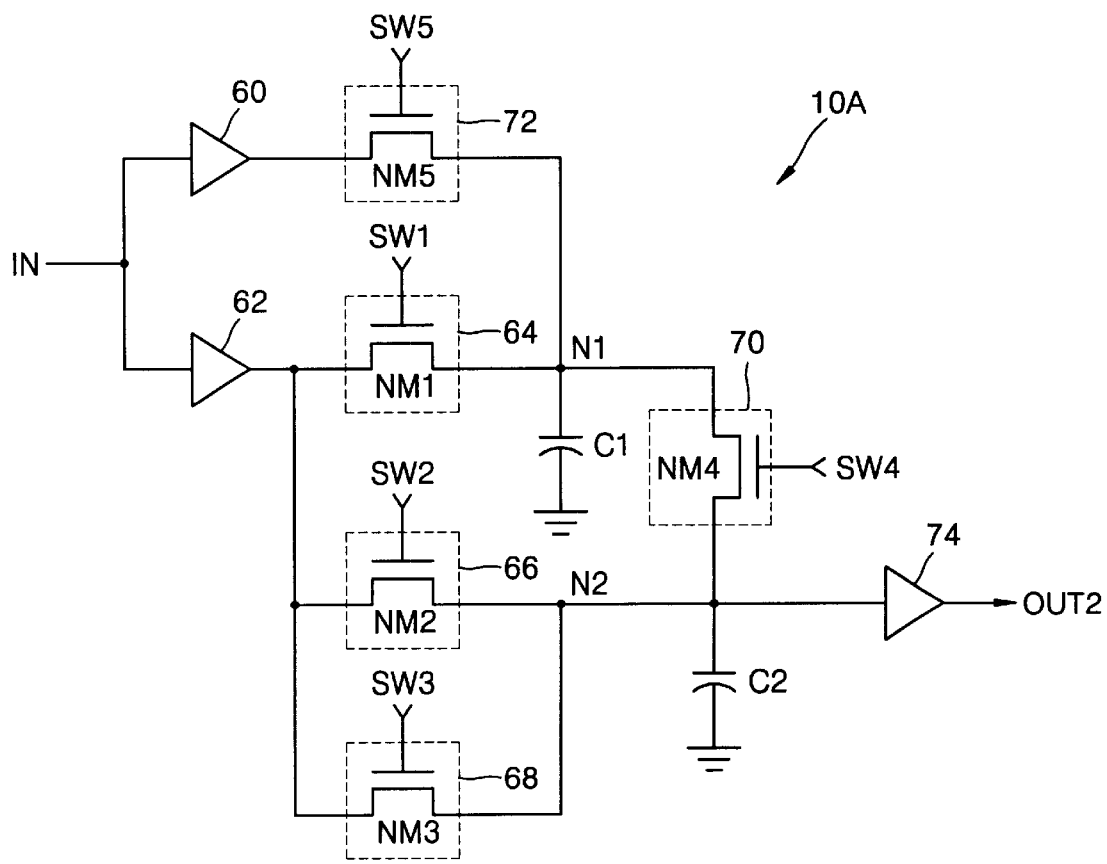
FIG. 2 is a circuit diagram illustrating a preferred embodiment of the present invention of the burst mode receiving apparatus shown in FIG. 1.

FIG. 2 is a circuit diagram illustrating a preferred embodiment 10A of the present invention of the burst mode receiving apparatus 10, shown in FIG. 1.

Referring to FIG. 2, the intermediate value detector 10A includes first and second capacitors C1 and C2 and first, second, third, fourth and fifth switches 64, 66, 68, 70 and 72, respectively. The intermediate value detector 10A may further include a plurality of buffers 60, 62 and 74.

The first capacitor C1 is connected to a first node N1 and a reference potential, e.g., a ground, so that it is positioned between the first node N1 and the reference potential, and charges a maximum value of an input signal input from the outside source through the input terminal IN. The second capacitor C2 is connected to a second node N2 and a reference potential so that it is positioned between the second node N2 and the reference potential, and charges a minimum value of the input signal.

The first switch 64 is connected to the input signal and the first node N1 so that it is positioned between the input signal and the first node N1. The first switch 64 is switched in response to a first switching signal SW1. In some cases, a buffer 62 may be provided between the first switch 64 and the input terminal IN. The buffer 62 serves to buffer the input signal input from the outside source through the input terminal IN and outputs the buffered result to the first switch 64.

The second switch 66 is connected to the input signal or the buffer 62 and the second node N2 so that it is positioned between the input signal or the buffer 62 and the second node N2. The second switch 66 is switched in response to a second switching signal SW2.

The third switch 68 is connected to the input signal or the buffer 62 and the second node N2 so that it is positioned between the input signal or the buffer 62 and the second node N2. The third switch 68 is switched in response to a third switching signal SW3.

The fourth switch 70 is connected to the first node N1 and the second node N2 so that it is positioned between the first node N1 and the second node N2. The fourth switch 70 is switched in response to a fourth switching signal SW4.

The fifth switch 72 is connected to the input signal input through the input terminal IN and the first node N1 so that it is positioned between the input signal and the first node N1. The fifth switch 72 is switched in response to a fifth switching signal SW5. In some cases, a buffer 60 may be provided between the fifth switch 72 and the input terminal IN. The buffer 60 serves to buffer the input signal input through the input terminal IN and outputs the buffered result to the fifth switch 72.

The first, second, third, fourth and fifth switches 64, 66, 68, 70 and 72, respectively, may be implemented with either NMOS transistors NM1, NM2, NM3, NM4 and NM5, as shown in FIG. 2, or bipolar transistors (not shown). The entire operation of the intermediate value detector 10A, shown in FIG. 2, having the above structure will be described in detail later.

According to the present invention, the burst mode receiving apparatus shown in FIG. 1 may further include a photodetector (not shown) and a preamplifier (not shown) to generate the input signal to be input to the intermediate value detector 10. The photodetector dynamically detects an optical signal in a packet unit, converts the detected optical signal into an electric signal, and outputs the electric signal to the preamplifier. The preamplifier amplifies the converted electric signal input from the photodetector and outputs the amplified result of the converted electric signal as the input signal to the intermediate value detector 10.

The amplifier 30, shown in FIG. 1, amplifies a difference between the input signal input from the outside source through the input terminal IN and a reference value input from the summing portion 16, and outputs the amplified result through an output terminal OUT1 while applying it to the offset compensator 14 and the controller 18, respectively. In a preferred embodiment, the amplifier 30 may be implemented with a comparator 30 having a very high gain including a positive (non-inverting) input terminal (+) for receiving the input signal through the input terminal IN, a negative (inverting) input terminal (−) for receiving the reference value from the summing portion 16, and an output terminal for outputting data recovered.

A voltage $V_{out}$ output from the comparator 30 can be written as the following [Expression 1]:

$$V_{out}=Gain\times(V^+-V^-+V_{offset}) \qquad \text{[Expression 1]}$$

wherein $V^+$ denotes a voltage input to the positive input terminal (+) of the comparator 30, $V^-$ denotes a voltage input to the negative input terminal (−) of the comparator 30, $V_{offset}$ denotes an offset voltage induced by each part of the burst mode receiving apparatus shown in FIG. 1 and the input signal, and Gain denotes a gain of the comparator 30. Therefore, although $V^+$ and $V^-$ are identical, an offset existing in the burst mode receiving apparatus allows the comparator 30 to generate an offset of $Gain\times V_{offset}$.

The summing portion 16 adds a compensation signal input from the offset compensator 14 and the intermediate value input from the intermediate value detector 10 to output the combined result as a reference value to the negative input terminal (−) of the comparator 30. In an embodiment of the present invention, the summing portion 16 may be implemented with a current-voltage converter (not shown) for adding the compensation signal of a current form input from the offset compensator 14 and the intermediate value of a voltage form input from the intermediate value detector 10, converting the added result into a reference value of a voltage form, and outputting the reference value to the amplifier 12. In terms of the characteristic of the current-voltage converter, the level of a current input to the current-voltage converter and the level of a voltage output from the current-voltage converter are inversely proportional.

The offset compensator 14 generates a compensation signal having a level varied corresponding to the amplified result input from the amplifier 12 and a compensation control signal input from the controller 18 and outputs the compensation signal to the summing portion 16. In a preferred embodiment of the present invention, the offset compensator 14, as shown in FIG. 1, may be implemented with a counter 42 and a digital-to-analog converter ("DAC") 40. The counter 42 performs a counting-up or counting-down operation in response to the amplified result input from the amplifier 12 and a clock signal CLK input from the controller 18 to output the counted-up or counted-down result to the DAC 40. The clock signal CLK corresponds to the compensation control signal generated from the controller 18 to correspond to a result obtained by analyzing the amplified result input to the controller 18 from the amplifier 12. The DAC 40 converts the counted-up or counted-down result input from the counter 42 into the form of an analog signal and outputs the resultant analog signal as the compensation signal to the summing portion 16. According to the present invention, as the number of bits to be counted by the counter 42 increases, the more an offset may be precisely compensated. When the number of the bits to be counted is increased, however, the size of circuits is increased accordingly. Thus, the design of the burst mode receiving apparatus must consider precision of an offset compensation, the size of circuits and a unit cost in manufacture suitably.

According to an alternate embodiment of the present invention, the offset compensator 14 may be implemented with a charge pump (not shown). In this alternate embodiment, the charge pump is enabled in response to a clock signal CLK input from the controller 18, supplies or sinks an electric charge in response to an amplified result input from the amplifier 12, and outputs a result obtained by supplying or sinking the electric charge as a compensation signal to the summing portion 16.

Referring back to FIG. 1, a preferred embodiment of the present invention may further include a bias signal generator 20. The bias signal generator 20 generates a bias signal in response to a bias control signal input from the controller 18 and outputs the generated bias signal to the summing portion 16. The controller 18 generates the bias control signal in response to the result obtained by analyzing the amplified result input from the amplifier 12 and outputs the generated bias control signal to the bias signal generator 20. At this time, the summing portion 16 outputs the bias signal input from the bias signal generator 20 as the reference value to the amplifier 12.

A data recovery method to be implemented in a burst mode receiving apparatus according to the present invention and a detailed operation of the burst mode receiving apparatus according to the present invention will now be described with reference to FIGS. 3 through 6.

Figure 3:
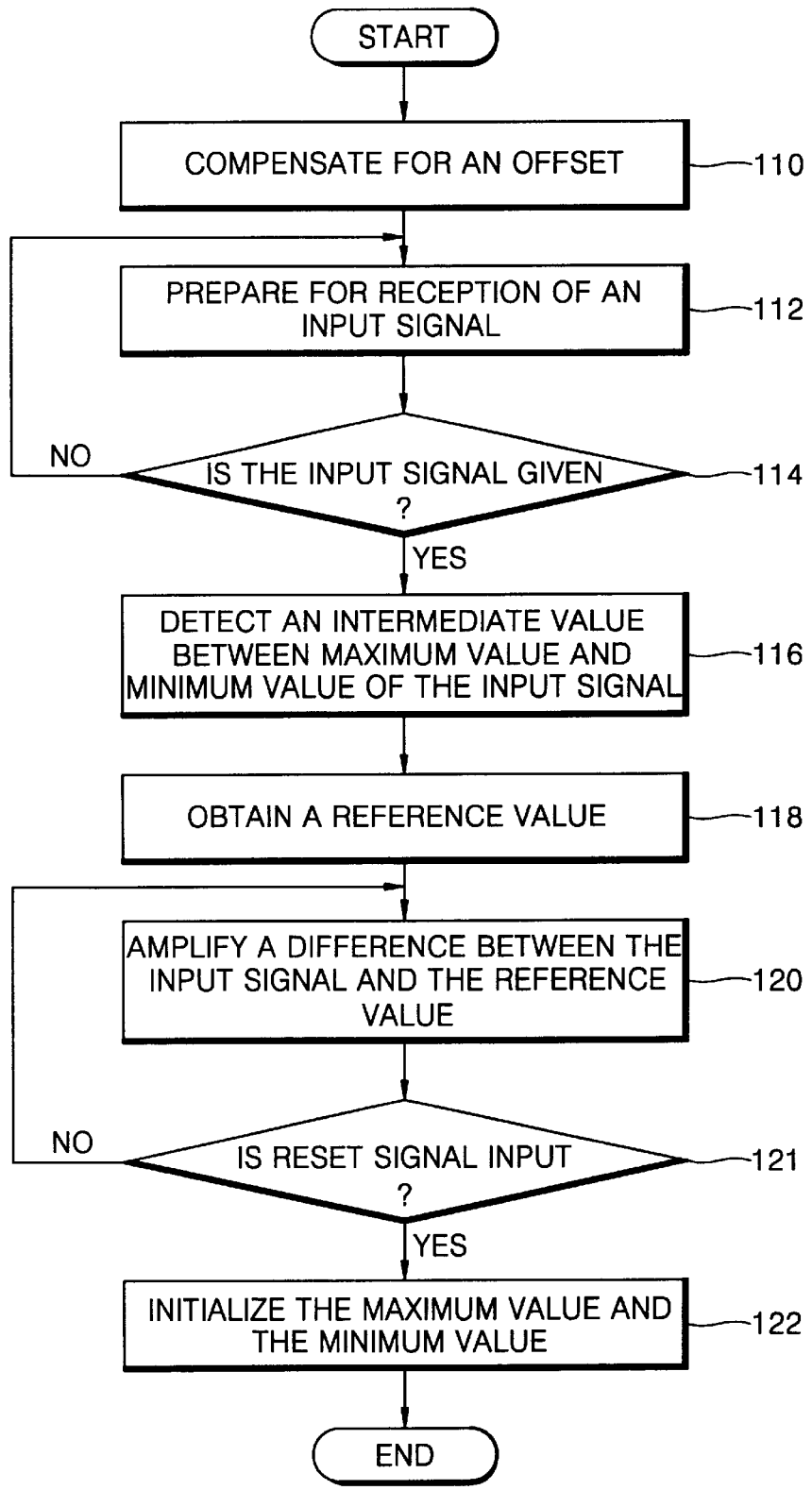
FIG. 3 is a flowchart illustrating a data recovery method, to be implemented in a burst mode receiving apparatus according to the present invention.

FIG. 3 is a flowchart illustrating a data recovery method, to be implemented in the burst mode receiving apparatus shown in FIG. 1 according to the present invention.

Referring to FIG. 3, the data recovery method may be divided into two phases. First, in steps 110 through 114, the method compensates for an offset before an input signal is input to the burst mode receiving apparatus. Second, in steps 116 through 122, the method obtains data recovered when the input signal is input to the burst mode receiving apparatus.

First, in step 110, the offset compensator (14 of FIG. 1) compensates for an offset of the burst mode receiving apparatus of the present invention.

An embodiment 110A of step 110 of the present invention will now be described in detail with reference to FIGS. 4 and 5.

Figure 4:
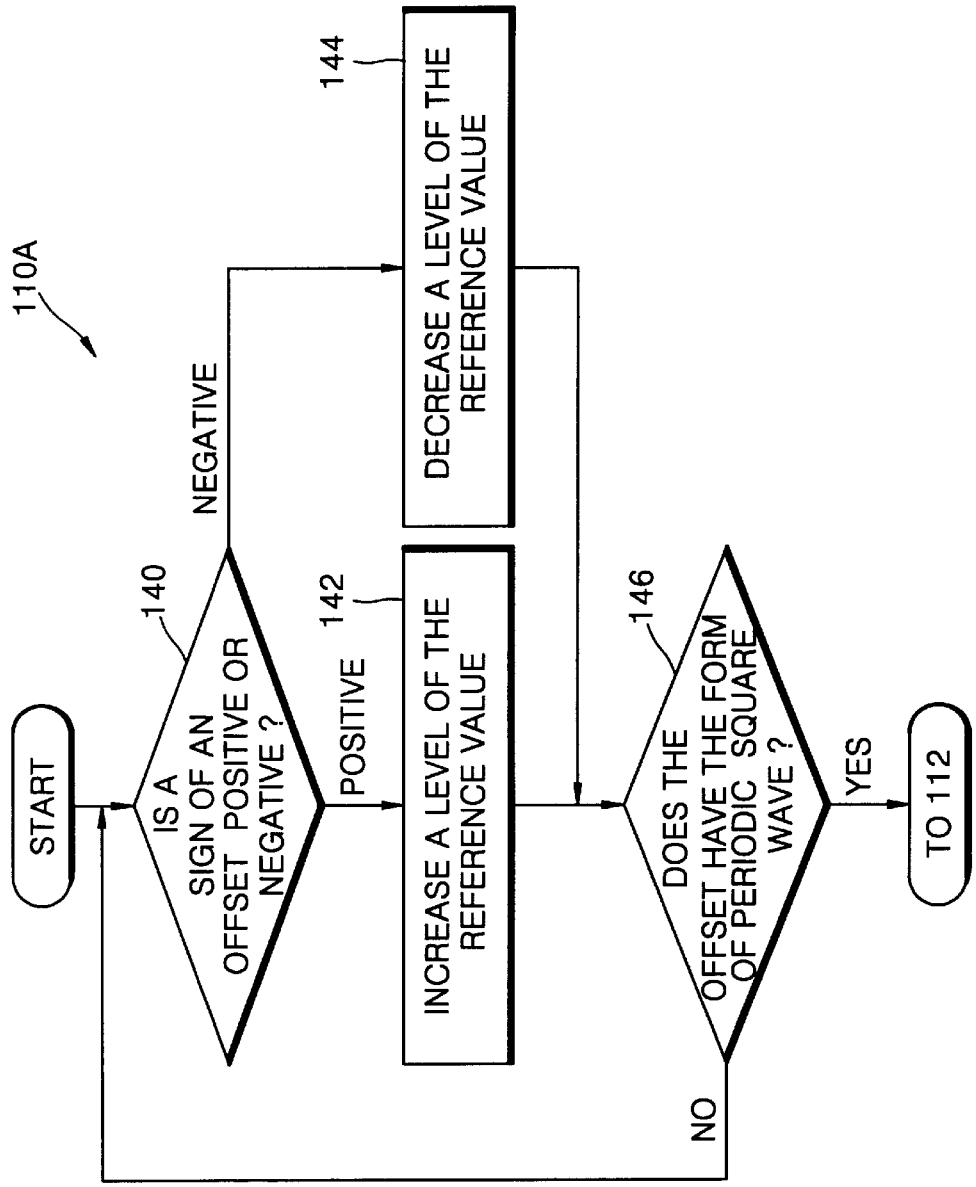
FIG. 4 is a flowchart illustrating an embodiment of a process routine of step 110 shown in FIG. 3 according to the present invention.

FIG. 4 is a flowchart illustrating an embodiment 110A of step 110 of FIG. 3 according to the present invention.

Referring to FIG. 4, step 110A includes steps 140 through 146 for increasing or decreasing a level of the reference value depending on whether a sign of an offset output from the amplifier 12 is positive or negative until the offset is in the form of a periodic square wave.

Figure 5:
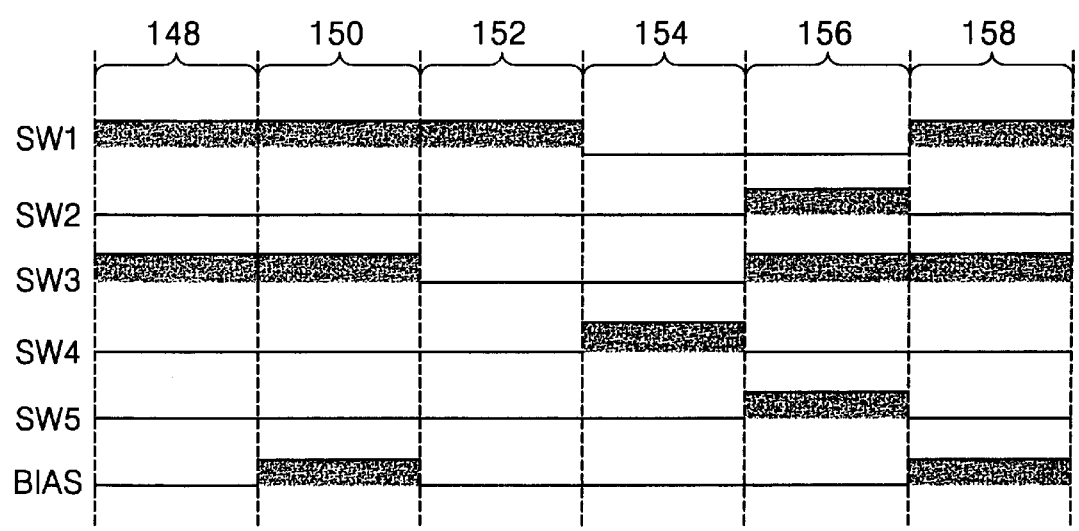
FIG. 5 is a waveform chart illustrating first, second, third, fourth and fifth switching signals and a bias signal according to a preferred embodiment of the present invention.

FIG. 5 is a waveform chart illustrating first, second, third, fourth and fifth switching signals SW1, SW2, SW3, SW4 and SW5, respectively, and a bias signal BIAS at an initialization stage 148, an idle stage 150, a preamble stage 152, a data stage 154, a reset stage 156 and an idle stage 158 for explaining the operation of the intermediate value detector 10A shown in FIG. 2 and the data recovery method shown in FIG. 3.

Referring to FIG. 5, step 110 (FIG. 3) is performed at the initialization stage 148. The initialization stage 148 refers to the time period from when electric power is supplied to the apparatus of FIG. 1 to when an offset output from the amplifier 12 is in the form of a square wave periodically repeating a "high" logic level and a "low" logic level before an input signal is input to the burst mode receiving apparatus through the input terminal IN. Accordingly, the controller 18 outputs a clock signal CLK as a compensation control signal to the counter 42 of the offset compensator 14 to perform step 110 at the initialization stage 148. The controller 18 outputs the first and third switching signals SW1 and SW3 at a "high" logic level and outputs the second, the fourth and fifth switching signals SW2, SW4 and SW5 and the bias signal BIAS at a "low" logic level.

Referring back to FIG. 4, at step 140, during the supply of the clock signal CLK from the controller 18 to the offset compensator 14 at the initialization stage 148, the offset compensator 14 determines whether a sign of an offset (Gain×$V_{offset}$) input from the amplifier 12 is positive or negative.

If it is determined that the offset (Gain×$V_{offset}$) has a positive value, that is, if it is determined that the offset (Gain×$V_{offset}$) is in a "high" logic level, in step 142, the offset compensator 14 and the summing portion 16 increase a level of the reference value to be input to the amplifier 12. On the other hand, it is determined that the offset (Gain×$V_{offset}$) has a negative value, that is, if it is determined that the offset (Gain×$V_{offset}$) is in a "low" logic level, in step 144, the offset compensator 14 and the summing portion 16 decrease a level of the reference value to be input to the amplifier 12.

According to one embodiment of the present invention, in order to perform steps 142 and 144, the counter 42 of the offset compensator 14 performs a counting-down operation when the offset (Gain×$V_{offset}$) has a positive value, and performs a counting-up operation when the offset (Gain×$V_{offset}$) has a negative value. At this time, the DAC 40 of the offset compensator 14 converts the counted result into the form of an analog signal and defines the resultant analog signal as a compensation signal.

According to an alternate embodiment of the present invention, in order to perform steps 142 and 144, the charge pump, which is used to implement the offset compensator 14, sinks (or supplies) an electric charge when the offset (Gain×$V_{offset}$) has a positive value and supplies (or sinks) an electric charge when the offset (Gain×$V_{offset}$) has a negative value. A result obtained by supplying or sinking the electric charge is output as a compensation signal.

Next, the summing portion 16 generates a reference value having the level inversely proportional to that of the compensation signal input from the offset compensator 14 and outputs the generated reference value to the negative input terminal (−) of the comparator 30 in the amplifier 12.

After step 142 or step 144, in step 146, the controller 18 determines whether the offset (Gain×$V_{offset}$) output from the amplifier 12 is in the form of a periodic square wave. This determination is performed because when the offset (Gain×$V_{offset}$) is compensated for to a certain extent, the offset (Gain×$V_{offset}$) output from the amplifier 12 has the form of a square wave, in which a "high" logic level and a "low" logic level are repeated periodically.

If it is determined that the offset (Gain×$V_{offset}$) does not have the form of a periodic square wave, the methods returns to step 140, then steps 140 through 144 are repeatedly performed to further compensate for the offset. If, on the other hand, it is determined that the offset (Gain×$V_{offset}$) has the form of a periodic square wave, it is determined that the offset is sufficiently compensated for and the method proceeds to step 112 of FIG. 3.

After step 110, in step 112, the method prepares for reception of an input signal from the outside source. Step 112 is performed at the idle stage 150. The idle stage 150 refers to the time period from when the offset Gain×$V_{offset}$ output from the amplifier 12 is in the form of a periodic square wave to when the input signal is input through the input terminal IN. At the idle stage 150, since the intermediate value detector 10 may generate a random value of a "low" or "high" logic level, the controller 18 outputs a bias control signal to the bias signal generator 20 so that the amplifier 12 can generate a signal having a constant level. Therefore, the bias signal generator 20 outputs a bias signal BIAS to the summing portion 16 in response to the bias control signal input from the controller 18.

At this time, the summing portion 16 outputs the bias signal BIAS as a reference value to the amplifier 12. The reason for this is that since the input signal is not input from the outside source at the idle stage 150 during which the bias signal BIAS is generated, an intermediate value between a maximum value and a minimum value of the input signal is not generated from the intermediate value detector 10, and since the clock signal CLK is not generated from the controller 18, the compensation signal is not output from the offset compensator 14, so that only the bias signal BIAS is input into the summing portion 16.

Further, at the idle stage 150, the controller 18 maintains the first and third switching signals SW1 and SW3 at a "high" logic level, and maintains the second, fourth and fifth switching signals SW2, SW4 and SW5 in a "low" logic level. Accordingly, in step 112 of FIG. 3, the first capacitor C1 of the intermediate value detector 10A waits for reception of the input signal so that it can charge a maximum value of the input signal therein, the second capacitor C2 charges a "low" logic level when the input signal is not input to the burst mode receiving apparatus as a minimum value of the input signal to detect the minimum value.

After step 112, in step 114, it is determined whether the input signal is input to the burst mode receiving apparatus from the outside source. More specifically, the controller 18 determines whether the amplified result output from the amplifier 12 is maintained at a constant logic level. If it is determined that the input signal is not input to the burst mode receiving apparatus from the outside source, i.e., if it is determined that the amplified result output from the amplifier 12 is maintained at a constant logic level, for example, in a "low" logic level, the controller 18 generates a bias control signal and a switching control signal, respectively, to perform step 112.

Alternatively, if it is determined that the input signal is input to the burst mode receiving apparatus from the outside source, i.e., if it is determined that the amplified result output from the amplifier 12 is not maintained at a constant logic level, in step 116, the controller 18 generates the switching control signal and the bias control signal to allow the intermediate value detector 10 to detect an intermediate value between a maximum value and a minimum value of the input signal. In step 116, the controller 18 generates the bias control signal in order to prevent the bias signal generator 20 from outputting the bias signal BIAS to the summing portion 16.

Figure 6:
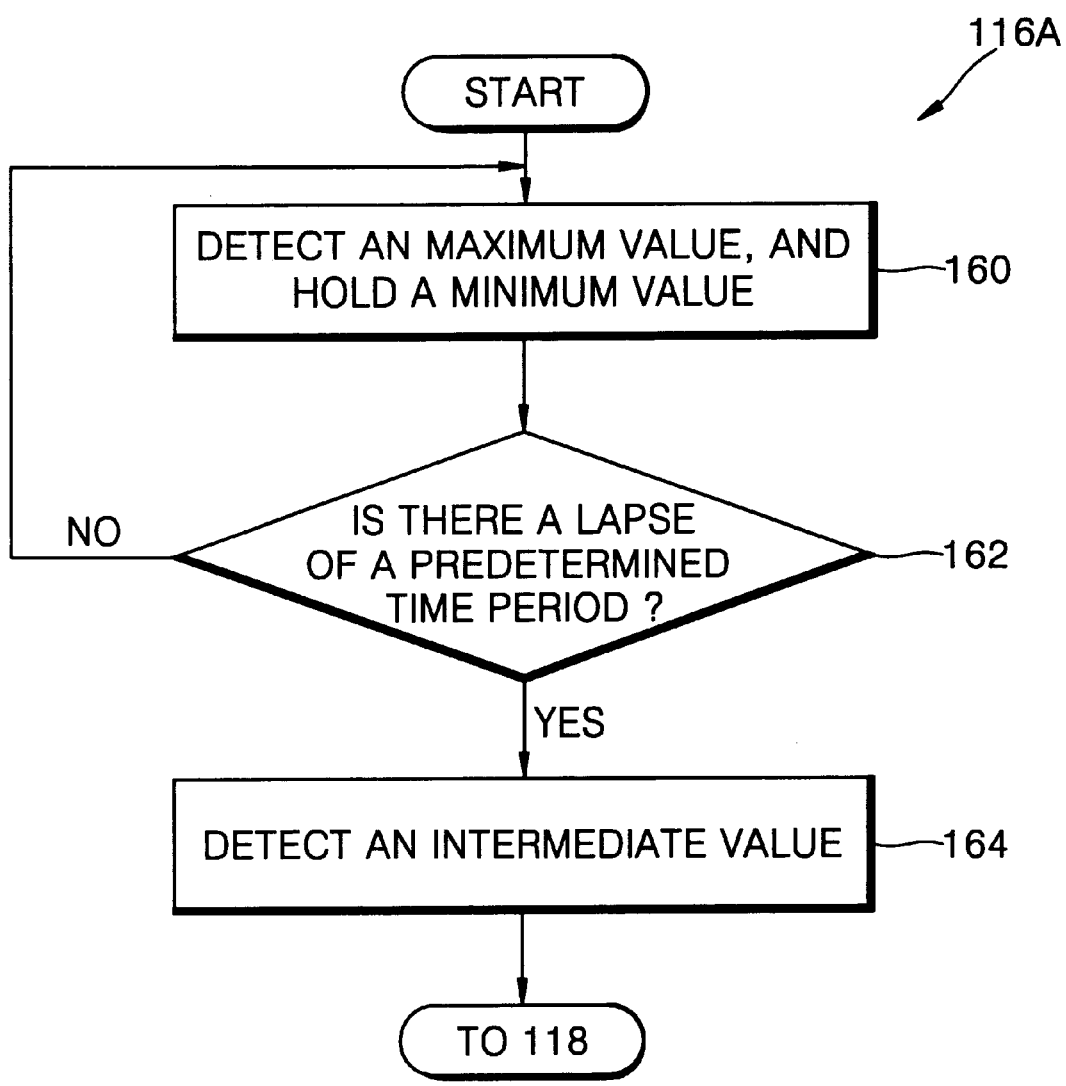
FIG. 6 is a flowchart illustrating an embodiment of a process routine of step 116 shown in FIG. 3 according to the present invention.

FIG. 6 is a flowchart illustrating an embodiment 116A of step 116 shown in FIG. 3 according to the present invention.

Referring to FIG. 6, step 116A includes steps 160 through 164 for detecting an intermediate value using a maximum value of the input signal detected and a minimum value of the input signal held.

If it is determined that the input signal is input to the burst mode receiving apparatus from the outside source, in step 160, the controller 18 generates the switching control signal to allow the intermediate value detector 10 to detect the maximum value of the input signal and to hold the minimum value detected in step 112 of FIG. 3. Step 160 is performed at the preamble stage 152. The preamble stage 152 refers to stage changed from the idle stage 150 when the input signal is input to the burst mode receiving apparatus through the input terminal IN. At the preamble stage 152, the controller 18 maintains the first switching signal SW1 at a "high" logic level, transfers a level state of the third switching signal SW3 from a "high" logic level to a "low" logic level, and maintains the second, fourth and fifth switching signals SW2, SW4 and SW5 and the bias signal BIAS at a "low" logic level. Accordingly, the minimum value of the input signal charged in the second capacitor C2 is held, and the maximum value begins to be charged in the first capacitor C1.

After step 160, in step 162, the controller 18 determines whether there is a lapse of a predetermined time period required to charge the maximum value of the input signal in the first capacitor C1. The predetermined time period is previously determined based on the capacitance of the first capacitor C1, which is determined by the design thereof. If it is determined that there is not a lapse of the predetermined time period required to charge the maximum value, the controller 18 generates the switching control signal and the bias control signal, as shown in the preamble stage 152 of FIG. 5, to repeat step 160.

If, on the other hand, it is determined that there is a lapse of the predetermined time period required to charge the maximum value, in step 164, the controller 18 allows the intermediate value detector 10 to detect an intermediate value between the maximum value detected at step 160 and the minimum value detected and held at step 112. Step 164 is performed at the data stage 154. The data stage 154 refers to a stage changed from the preamble stage 152 after a lapse of the predetermined time period required to charge the maximum value. At the data stage 154, the controller 18 transfers a level state of the first switching signal SW1 from a "high" logic level to a "low" logic level and a level state of the fourth switching signal SW4 from a "low" logic level to a "high" logic level, and maintains the second, third and fifth switching signals SW2, SW3 and SW5 and the bias signal BIAS at a "low" logic level. Accordingly, only the fourth switch 70 becomes "on" so that the intermediate value is charged in the first and second capacitors C1 and C2 and is output to the summing portion 16 through the second node N2 via the output terminal OUT2. In some embodiments, as shown in FIG. 2, a buffer 74 may be provided between the second node N2 and the output terminal OUT2. The buffer 74 acts to buffer the intermediate value and outputs the buffered result to the summing portion 16 through the output terminal OUT2.

Referring back to FIGS. 1 and 3, when step 116 is performed, in step 118 the summing portion 16 adds the intermediate value input from the intermediate value detector 10 and the compensation signal input to the offset compensator 14 and outputs the added result as a reference value to the amplifier 12. At step 118, since the offset compensator 14 is not operated and the bias signal generator 20 does not generate the bias signal BIAS, the summing portion 16 outputs as the reference value the detected intermediate value having the form of voltage input from the intermediate value detector 10 to the amplifier 12.

After step 118, in step 120, the amplifier 12 amplifies a difference between the input signal input from the input terminal IN and the reference value input from the summing portion 16, and determines the amplified result as recovery data to output the determined recovery data through an output terminal OUT1 (data stage 154 of FIG. 5). At this time, the recovery data may be supplied to a clock data restoring section (not shown). For example, such a clock data restoring section receives the recovered data adjusts a duty cycle of the received data and synchronizes a phase of the received recovery data.

After step 120, in step 121, the controller 18 determines whether a reset signal RST is input from the outside source. If it is determined in step 121 that the reset signal RST is not input, the method returns to step 120. However, if it is determined in step 121 that the reset signal RST is input, in step 122, the maximum and minimum values of the input signal are initialized. In this case, the controller 18 generates the switching control signal and outputs the switching control signal to the intermediate value detector 10 to initialize the maximum and minimum values of the input signal when the reset signal RST is input. Step 122 is performed at the reset stage 156 changed from the data stage 154 when the reset signal RST is input from the outside source. At the reset stage 156, the controller 18 transfers a level state of the second, third and fifth switching signals SW2, SW3 and SW5 from a "low" logic level to a "high" logic level and a level state of the fourth switching signal SW4 from a "high" logic level to a "low" logic level, and maintains the first switching signal SW1 at a "low" logic level. Accordingly, the intermediate value charged in the second capacitor C2 is discharged through the buffer 62 by way of the second switch 66, and the intermediate value charged in the first capacitor C1 is discharged through the buffer 60 by way of the fifth switch 72. If the buffer 60 or 62 is not provided, however, the charged intermediate value is discharged through a preamplifier.

The data recovery method according to the present invention shown in FIG. 3 obtains recovery data from the input signal, discretely in a packet unit, input to the burst mode receiving apparatus from the outside source. Accordingly, the data recovery method according to the present invention performs a data recovery process for a packet input signal, and then enters the idle stage 158 shown in FIG. 5. Subsequently, the data recovery method is in the idle stage 158 until the next packet input signal is input to the burst mode receiving apparatus through the input terminal IN. At that time, the idle stage 150, which is changed from the initialization stage 148, does not perform an offset compensation, whereas the idle stage 158, which is changed from the reset stage 156, does perform the offset compensation. That is, after electric power is input to the burst mode receiving apparatus shown in FIG. 1, the controller 18 generates a clock signal CLK as a compensation control signal to perform step 110 of FIG. 3. Also, after the reset signal RST is input to the controller 18 from the outside source to perform step 122, the controller 18 generates the clock signal CLK to again perform step 110. At that time, step 110 is performed during one or two cycles of the clock signal CLK at the idle stage 158, but step 110 is performed during many cycles of the clock signal CLK at initialization stage 148. The reason for this is that when electric power is first input to the burst mode receiving apparatus, an offset in each element shown in FIG. 1 must be compensated for from the beginning, whereas only an offset due to an external environment such as temperature is compensated for during period of time from when one packet input signal is processed to when the next packet input signal is input to the burst mode receiving apparatus.

As described above, a burst mode receiving apparatus having an offset compensating function and a data recovery method according to the present invention has several advantages in that it is possible to eliminate the need for an external tuning, compensate for an offset more precisely by increasing the number of bits to be counted in the counter 42 of the offset compensator 14, and provide the intermediate value detector 10 and the amplifier 12 having a feedforward-scheme to operate at a high speed.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A burst mode receiving apparatus having an offset compensating function, comprising:

an intermediate value detector to detect an intermediate value between a maximum value and a minimum value of an input signal of an analog form discretely input from an outside source in response to a switching control signal, and output the detected intermediate value;

an amplifier to amplify a difference between the input signal and a reference value, and output the amplified result;

an offset compensator to generate a compensation signal having a level varied corresponding to the amplified result input from the amplifier and a compensation control signal;

a summing portion to add the, compensation signal input from the offset compensator and the intermediate value input from the intermediate value detector to output the added result as the reference value to the amplifier; and a controller to generate the switching control signal and the compensation control signal corresponding to a result obtained by analyzing the amplified result input from the amplifier and a reset signal input from the outside source.

2. The burst mode receiving apparatus as claimed claim 1, wherein the burst mode receiving apparatus further comprises:

a bias signal generator to generate a bias signal in response to a bias control signal and to output the generated bias signal to the summing portion, the controller generates the bias control signal in response to the result obtained by analyzing the amplified result input from the amplifier, and the summing portion outputs the bias signal input to the bias signal generator as the reference value.

3. The burst mode receiving apparatus as claimed claim 1, wherein the offset compensator comprises:

a counter to perform a counting-up or counting-down operation in response to the amplified result input from the amplifier and a clock signal corresponding to the compensation control signal input from the controller to output the counted-up or counted-down result; and a digital-to-analog converter to convert the counted-up or counted-down result input from the counter into the form of an analog signal and to output the resultant analog signal as the compensation signal to the summing portion.

4. The burst mode receiving apparatus as claimed in claim 1, wherein the offset compensator comprises:

a charge pump being enabled in response to a clock signal corresponding to the compensation control signal input from the controller, the charge pump for supplying or sinking an electric charge in response to the amplified result and for outputting a result obtained by supplying or sinking the electric charge as the compensation signal to the summing portion.

5. The burst mode receiving apparatus as claimed in claim 1, wherein the amplifier comprises:

a comparator having a very high gain including:
a positive (non-inverting) input terminal for receiving the input signal;
a negative (inverting) input terminal for receiving the reference value from the summing portion; and
an output terminal for outputting data recovered.

6. The burst mode receiving apparatus as claimed claim 1, wherein the intermediate value detector comprises:

a first capacitor, connected to a first node and a reference potential so that it is positioned between the first node and the reference potential, for charging the maximum value of the input signal;

a second capacitor, connected to a second node and a reference potential so that it is positioned between the second node and the reference potential, for charging the minimum value of the input signal;

a first switch connected between the input signal and the first node, the first switch being switched in response to a first switching signal;

a second switch connected between the input signal and the second node, the second switch being switched in response to a second switching signal;

a third switch connected between the input signal and the second node, the third switch being switched in response to a third switching signal;

a fourth switch connected to the first node and the second node so that it is positioned between the first node and the second node, the fourth switch being switched in response to a fourth switching signal; and a fifth switch connected between the input signal and the first node, the fifth switch being switched in response to a fifth switching signal, wherein the detected intermediate value is output through the second node, and the first, second, third, fourth and fifth switching signals correspond to the switching control signal.

7. The burst mode receiving apparatus as claimed claim 6, wherein the first through fifth switches are NMOS transistors.

8. The burst mode receiving apparatus as claimed claim 6, wherein the first through fifth switches are bipolar transistors.

9. The burst mode receiving apparatus as claimed in claim 6, wherein the intermediate value detector further comprises:

a first buffer positioned between the input signal and the fifth switch, the first buffer for buffering the input signal and outputting the buffered input signal to the fifth switch; and a second buffer positioned between the input signal and one or more of the first switch, the second switch, and the third switch, the second buffer for buffering the input signal and outputting the buffered input signal to the one or more of the first switch, the second switch, and the third switch.

10. The burst mode receiving apparatus as claimed in claim 9, further comprising:

a third buffer for buffering the intermediate value prior to outputting the intermediate value to the summing portion.

11. The burst mode receiving apparatus as claimed claim 1, wherein the burst mode receiving apparatus further comprises:

a photodetector for dynamically detecting an optical signal in a packet unit, for converting the detected optical signal into an electric signal, and for outputting the converted electric signal; and a preamplifier for amplifying the converted electric signal input from the photodetector and outputting the amplified result of the converted electric signal as the input signal to the intermediate value detector.

12. The burst mode receiving apparatus as claimed claim 1, wherein the summing portion comprises:

a current-voltage converter for adding the compensation signal of a current form and the intermediate value of a voltage form, for converting the added result into the reference value of a voltage form, and for outputting the reference value to the amplifier.

13. A data recovery method in a burst mode receiving apparatus, comprising:

(a) compensating for an offset of the burst mode receiving apparatus;

(b) preparing for reception of an input signal from an outside source;

(c) determining whether the input signal is given from the outside source, and returning to (b) if it is determined that the input signal is not given from the outside source;

(d) detecting an intermediate value between a maximum value and a minimum value of the input signal if it is determined that the input signal is given from the outside source;

(e) adding a compensation signal and the detected intermediate value to obtain a reference value;

(f) amplifying a difference between the input signal and the reference value and determining the amplified result as recovery data;

(g) determining if a reset signal is input, and returning to (f) if the reset signal is not input; and (h) initializing the maximum value and the minimum value of the input signal if the reset signal is input.

14. The data recovery method as claimed in claim 13, wherein compensating for an offset of the burst mode receiving apparatus comprises:

(a1) determining whether a sign of the offset output from the amplifier is positive or negative when the input signal is not given from the outside source;

(a2) increasing a level of the reference value if it is determined that the sign of the offset is positive;

(a3) decreasing a level of the reference value if it is determined that the sign of the offset is negative; and (a4) after increasing or decreasing a level of the reference value, determining whether the offset is in a form of a periodic square wave, returning to (a1) if the offset is not in the form of a periodic square wave, and proceeding to (b) if it is determined that the offset is in the form of a periodic square wave.

15. The data recovery method as claimed in claim 13, wherein preparing for reception of an input signal from an outside source comprises:

after compensating for an offset of the burst mode receiving apparatus, generating a bias signal and detecting the minimum value of the input signal, wherein the offset output from the amplifier is maintained at a constant logic level when the bias signal is generated.

16. The data recovery method as claimed in claim 14, wherein increasing and decreasing a level of the reference value comprise:

performing a counting-up operation if it is determined that the sign of the offset is negative, and performing a counting-down operation if it is determined that the sign of the offset is positive;

converting the counted-up or counted-down result into the form of an analog signal and determining the resultant analog signal as the compensation signal; and generating the reference value having a level inversely proportional to a level of the compensation signal.

17. The data recovery method as claimed in claim 13, wherein detecting an intermediate value comprises:

(d1) detecting the maximum value of the input signal and holding the minimum value detected at (d) if it is determined that the input signal is given from the outside source;

(d2) determining whether there is a lapse of a predetermined time period required to charge the maximum value of the input signal, and returning to (d1) if it is determined that there is not a lapse of the predetermined time period; and (d3) detecting the intermediate value between the maximum value detected at (d1) and the held minimum value and proceeding to (e) if it is determined that there is a lapse of the predetermined time period.

* * * * *